(12) United States Patent
Arimilli et al.

(10) Patent No.: US 6,480,975 B1
(45) Date of Patent: Nov. 12, 2002

(54) ECC MECHANISM FOR SET ASSOCIATIVE CACHE ARRAY

(75) Inventors: Ravi Kumar Arimilli, Austin, TX (US); John Steven Dodson, Pflugerville, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,617

(22) Filed: Feb. 17, 1998

(51) Int. Cl.$^7$ ............................ H02H 3/05; H05K 10/00
(52) U.S. Cl. .................. 714/52; 714/763; 714/767; 714/768; 714/769; 714/770; 714/804; 714/805
(58) Field of Search ...................... 714/52, 763, 767, 714/768, 769, 770, 804, 805

(56) References Cited

U.S. PATENT DOCUMENTS

| | | | | |
|---|---|---|---|---|
| 5,164,944 A | * | 11/1992 | Benton et al. ............... | 714/767 |
| 5,345,582 A | * | 9/1994 | Tsuchiya ..................... | 714/53 |
| 5,392,410 A | * | 2/1995 | Liu .............................. | 711/3 |
| 5,418,796 A | * | 5/1995 | Price et al. .................. | 714/762 |
| 5,418,922 A | * | 5/1995 | Liu .............................. | 711/3 |
| 5,551,066 A | * | 8/1996 | Stillman et al. ............. | 455/69 |
| 5,629,950 A | * | 5/1997 | Godiwala et al. .......... | 714/805 |
| 5,666,371 A | * | 9/1997 | Purdham ..................... | 714/763 |
| 5,867,511 A | * | 2/1999 | Arimilli et al. ............. | 714/805 |
| 5,875,201 A | * | 2/1999 | Bauman et al. ............. | 714/800 |
| 5,909,449 A | * | 6/1999 | So et al. ...................... | 714/721 |
| 5,940,877 A | * | 8/1999 | Eickemeyer et al. ........ | 711/200 |
| 6,014,721 A | * | 1/2000 | Arimilli et al. ............. | 710/129 |
| 6,014,756 A | * | 1/2000 | Dottling et al. ............. | 714/15 |
| 6,016,535 A | * | 1/2000 | Krantz et al. ............... | 711/171 |
| 6,023,746 A | * | 2/2000 | Arimilli et al. ............. | 711/118 |
| 6,038,693 A | * | 3/2000 | Zhang ......................... | 714/768 |
| 6,067,656 A | * | 5/2000 | Rusu et al. .................. | 714/768 |
| 6,078,459 A | * | 6/2000 | Nonoyama ................. | 360/73.08 |
| 6,115,795 A | * | 9/2000 | Gilda et al. ................. | 711/141 |

OTHER PUBLICATIONS

IBMTDB, Quick Early Castout From Store–in Caches, vol. 28, issue 11, pp. 5033–5034, Apr. 1, 1986.*
IBMTDB, Dynamic Cache Line Delete, vol. 32, issue 6A, p. 439, Nov. 1, 1989.*
IBMTD vol. 31, issue 1, p. 127–128, Jun. 1998.*

* cited by examiner

Primary Examiner—Ayaz Sheikh
Assistant Examiner—Frantz B. Jean
(74) Attorney, Agent, or Firm—Volel Emile; Bracewell & Patterson, L.L.P.

(57) ABSTRACT

A method of checking for errors in a set associative cache array, by comparing a requested value to values loaded in the cache blocks and determining, concurrently with this comparison, whether the cache blocks collectively contain at least one error (such as a soft error caused by stray radiation). Separate parity checks are performed on each cache block and if a parity error occurs, an error correction code (ECC) is executed for the entire congruence class, i.e., only one set of ECC bits are used for the combined cache blocks forming the congruence class. The cache operation is retried after ECC execution. The present invention can be applied to a cache directory containing address tags, or to a cache entry array containing the actual instruction and data values. This novel method allows the ECC to perform double-bit error as well, but a smaller number of error checking bits is required as compared with the prior art, due to the provision of a single ECC field for the entire congruence class. This construction not only leads to smaller cache array sizes, but also to faster overall operation by avoiding unnecessary ECC circuit operations.

21 Claims, 3 Drawing Sheets

ECC MECHANISM FOR SET ASSOCIATIVE CACHE ARRAY

BACKGROUND OF THE INVENTION

1. Field of the Invention

The present invention generally relates to computer systems, and more particularly to a method of improving the performance of a cache used by a processor of a computer system, by reducing delays associated with parity checks and error correction codes.

2. Description of the Related Art

The basic structure of a conventional computer system 10 is shown in FIG. 1. Computer system 10 may have one or more processing units, two of which 12a and 12b are depicted. Processing units 12a and 12b are connected to various peripheral devices including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. Also, instead of connecting I/O devices 14 directly to bus 20, they may be connected to a secondary (I/O) bus which is further connected to an I/O bridge to bus 20. The computer can have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 usually comes through cache 30. Although FIG. 1 depicts only a two-level cache hierarchy, multi-level cache hierarchies can be provided where there are many levels of interconnected caches.

A cache has many "blocks" which individually store the various instructions and data values. The blocks in any cache are divided into groups of blocks called "sets" or "congruence classes." A set is the collection of cache blocks that a given memory block can reside in. For any given memory block, there is a unique set in the cache that the block can be mapped into, according to preset mapping functions. The number of blocks in a set is referred to as the associativity of the cache, e.g., 2-way set associative means that for any given memory block there are two blocks in the cache that the memory block can be mapped into; however, several different blocks in main memory can be mapped to any given set. A 1-way set associate cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multiprocessor computer system (indicating the validity of the value stored in the cache). The address tag is a subset of the full address of the corresponding memory block. A compare match of an incoming address with one of the tags within the address tag field indicates a cache "hit." The collection of all of the address tags in a cache is referred to as a directory (and sometimes includes the state bit and inclusivity bit fields), and the collection of all of the value fields is the cache entry array.

When all of the blocks in a congruence class for a given cache are full and that cache receives a request, whether a "read" or "write," to a memory location that maps into the full congruence class, the cache must "evict" one of the blocks currently in the class. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction". At the end of this process, the cache no longer holds a copy of the evicted block.

FIG. 2 illustrates the foregoing cache structure and eviction process. A cache 40 (L1 or a lower level) includes a cache directory 42, a cache entry array 44, an LRU array 46, and control logic 48 for selecting a block for eviction from a particular congruence class. The depicted cache 40 is 8-way set associative, and so each of the directory 42, cache entry array 44 and LRU array 46 has a specific set of eight blocks for a particular congruence class as indicated at 50. In other words, a specific member of the congruence class in cache directory 42 is associated with a specific member of the congruence class in cache entry array 44 and with a specific member of the congruence class in LRU array 46, as indicated by the "X" shown in congruence class 50.

A bit in a given cache block may contain an incorrect value, either due to a soft error (a random, transient condition caused by, e.g., stray radiation or electrostatic discharge) or to a hard error (a permanent condition, e.g., defective cell). One common cause of errors is a soft error resulting from alpha radiation emitted by the lead in the solder (C4) bumps used to form wire bonds with circuit leads. Most errors are single-bit errors, that is, only one bit in the field is incorrect. In order to deal with potential errors, each of the blocks in directory 42 is connected to the control logic via an error correction code (ECC) circuit 52 which can be used to reconstruct the proper data stream. Some ECCs can only be used to detect and correct single-bit errors, i.e., if two or more bits in a particular block are invalid then the ECC might not be able to determine what the proper data stream should actually be, but at least the failure can be detected. Other ECCs are more sophisticated and even allow detection or correction of double errors. These latter errors are costly to correct, but the design tradeoff is to halt the machine when double-bit errors occur. Although only directory 42 is shown with ECC circuits, these circuits can similarly be used with other arrays, such as cache entry array 44.

The outputs of ECC circuits 52, whose values correspond to (corrected) memory block addresses, are connected to respective comparators 54 each of which also receives the address of the requested memory block. If a valid copy of a requested memory block is in the congruence class 50, then one, and only one, of the comparators 54 will output an active signal. The outputs of comparators 54 are connected to a multiplexer 56 and also to an OR gate 58, whose output controls multiplexer 56. If a cache hit occurs (a requested address matches with an address in cache directory 42), then OR gate 58 activates multiplexer 56 to pass on a signal indicating which member of the congruence class matches the address. This signal controls another multiplexer 60 which receives inputs from each of the entries in cache entry array 44. In this manner, when a cache hit in the directory occurs, the corresponding value is passed through multiplexer 60 to a bus 62.

If a cache miss occurs, and if all of the blocks in the particular congruence class 50 already have valid copies of memory blocks, then one of the cache blocks in congruence class 50 must be selected for victimization. This selection is performed using the LRU bits for the congruence class in LRU array 46. For each cache block in the class, there are a plurality of LRU bits, for example, three LRU bits per block for an 8-way set associative cache. The LRU bits from each block in the class are provided as inputs to a decoder 64 having an 8-bit output to indicate which of the blocks is to be victimized. This output is coupled to multiplexer 56. In this manner, if OR gate 58 is not active, multiplexer 56 passes on an indication of the cache block to be used based on the outputs of decoder 64.

There are several disadvantages and limitations in the foregoing cache construction with respect to ECC circuit design. First, ECC circuits 52 are fairly complex and take up space on the chip. Second, they seriously slow down processing since they are in the critical (timing) path for retrieving the cached values (either from directory or cache). Third, the ECC circuits require extra bits to be included in the address tag. For example, a 32-bit address tag requires a 7-bit ECC, so the effective size of the tag is 39 bits. These extra ECC bits must be transmitted along with the other bits, taking up bus bandwidth, and also require that the cache array be physically larger. Again, for example, if a cache directory were 8-way associative and each address tag had 7 ECC bits, then a total of 56 ECC bits would be required for each congruence class. The problem is clearly aggravated in caches of very large sizes. Conversely stated, the present of so many ECC bits makes it more difficult to place a given size cache on a smaller area of silicon. In light of the foregoing, it would be desirable to devise a cache construction allowing single-bit error correction and double-bit error detection, but which provided faster access to the directory or cache entry array. It would be further advantageous if the cache construction provided such error correction and detection without requiring the large number of ECC bits used in prior art schemes.

SUMMARY OF THE INVENTION

It is therefore one object of the present invention to provide an improved cache to be used by a processor of a computer system.

It is another object of the present invention to provide such a cache which allows for single-bit error correction and double-bit error detection using error correcting codes, but which does not introduce a significant delay in cache operation if correction of a value or tag is not required.

It is yet another object of the present invention to provide such a cache using error correcting codes, but having fewer ECC bits than conventional designs.

The foregoing objects are achieved in a method of checking for errors in a cache array used by a processor of a computer system, generally comprising the steps of mapping a plurality of memory blocks to one or more congruence classes of the array, loading a plurality of values into cache blocks of the congruence class(es), comparing a requested value associated with one of the memory blocks to the values loaded in the cache blocks and determining, concurrently with said comparing step, whether the cache blocks collectively contain at least one error (such as a soft error caused by stray radiation). The method preferably includes the step of performing separate parity checks on each of the cache blocks. If a parity error is detected for any block, an error correction code is executed for the entire congruence class, i.e., only one set of ECC bits are used for the combined cache blocks forming the congruence class. Parity checkers are connected in parallel with comparators used for the comparison, to achieve error detection concurrent with the comparison. The output of the parity checkers can be connected to an OR gate whose output is further used to activate the ECC for the congruence class. If an error is detected and the ECC is executed, the cache operation is retried after ECC execution. The present invention can be applied to a cache directory containing address tags, or to a cache entry array containing the actual instruction and data values. This novel method allows the ECC to perform double-bit error as well, but a smaller number of error checking bits is required as compared with the prior art, due to the provision of a single ECC field for the entire congruence class. For example, in the previous prior art ECC scheme, an 8-way set associative cache with 32 bits of tag would reuqire a total of 56 ECC bits; with the present invention, the number of required ECC bits is reduced to 10. This construction not only leads to smaller cache array sizes, but also to faster overall operation by avoiding unnecessary ECC circuit operations.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 3:
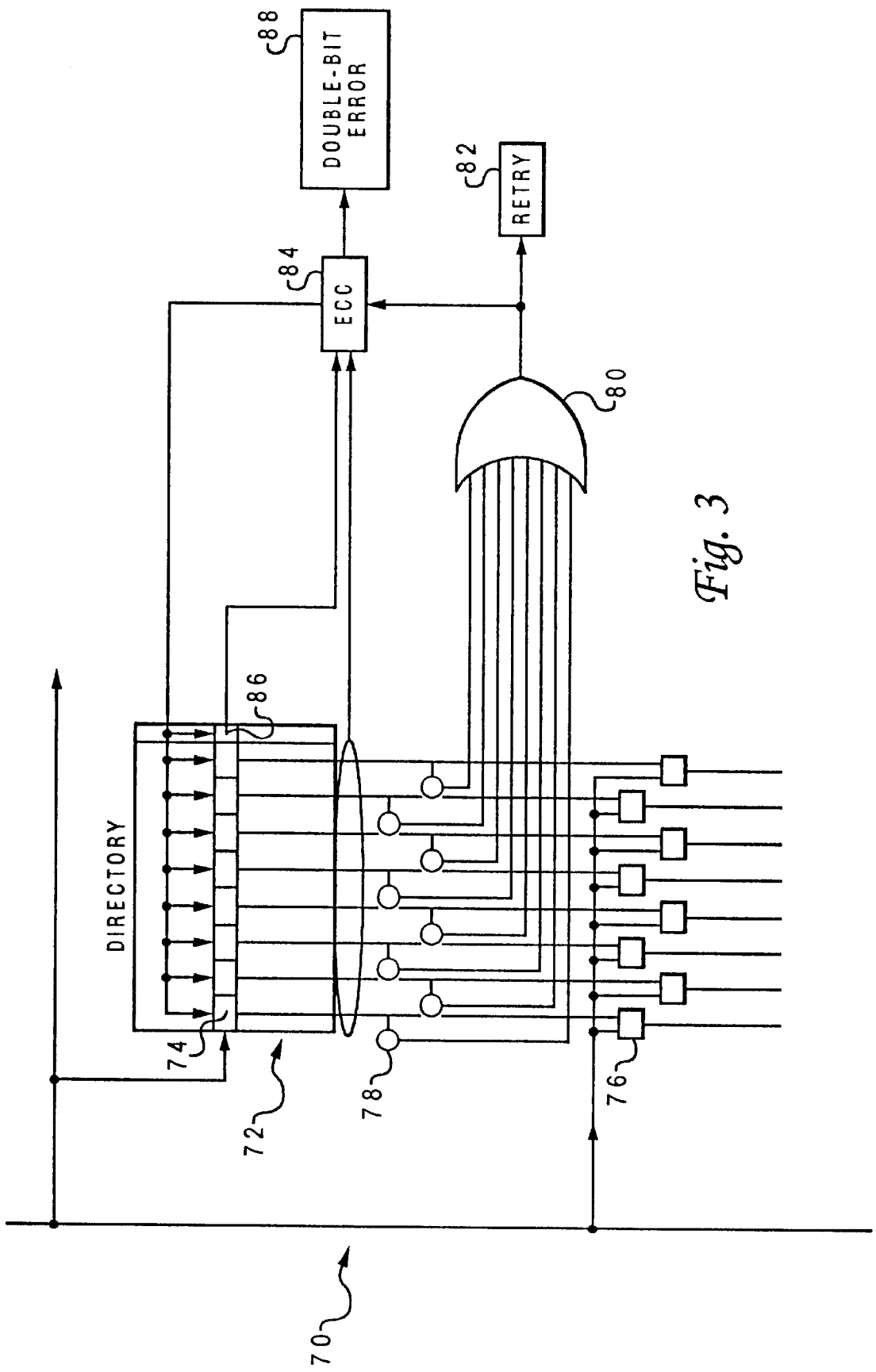
FIG. 3 is a high level schematic diagram of a directory of a set associative cache constructed in accordance with the present invention, having parallel parity error control and a single error correcting code for each congruence class.

With reference now to the figures, and in particular with reference to FIG. 3, there is depicted a high level schematic diagram of one embodiment of a set associative cache 70 constructed in accordance with the present invention. Cache 70 includes a cache directory 72 having a plurality of address tags associated into sets, such as set or congruence class 74, with the depicted embodiment being 8-way set associative. Each congruence class is associated with a corresponding congruence class in an LRU array (not shown) which is used for evicting the cache, and with a corresponding congruence class in a cache entry array (not shown) which contains values (instructions or data) associated with the address tags in directory 72.

Each block in a given congruence class of directory 72 has an output connected to a respective comparator 76, each of which receives the address of a requested memory block. If a valid copy of the requested memory block is in the congruence class 74, then one and only one of the comparators 76 will output an active signal to indicate which member of the set holds the valid copy. Each of the outputs from directory 72 is also connected to a respective parity checker 78, in parallel with the connection to a respective comparator 76. Parity checkers 78 do not perform any correction of erroneous bits, but rather are used only to indicate that an error has occurred in reading an address tag (or status bit) from directory 72. This error information is used as discussed further below.

Figure 1:
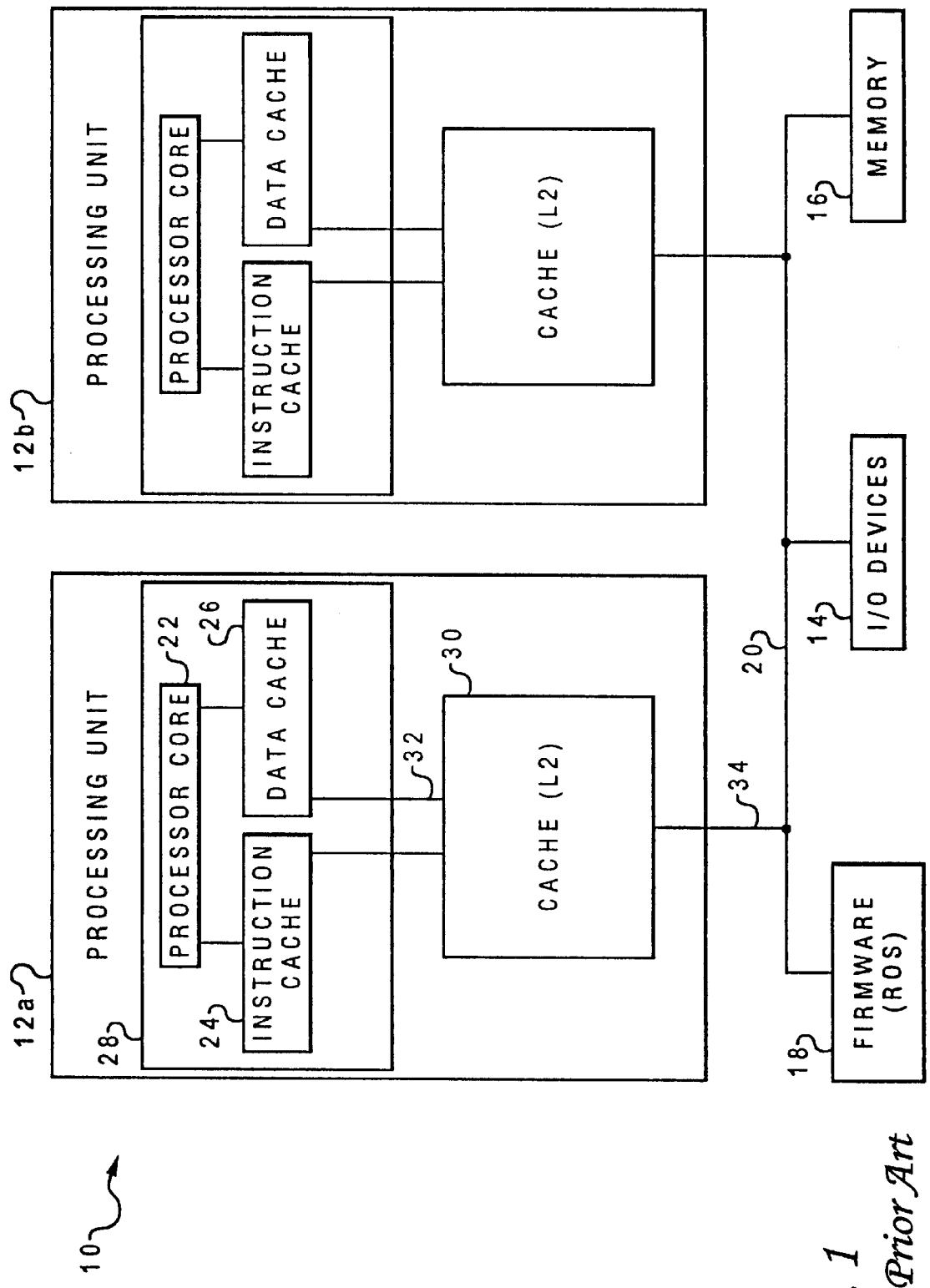
FIG. 1 is a block diagram of a prior art multiprocessor computer system.
Figure 2:
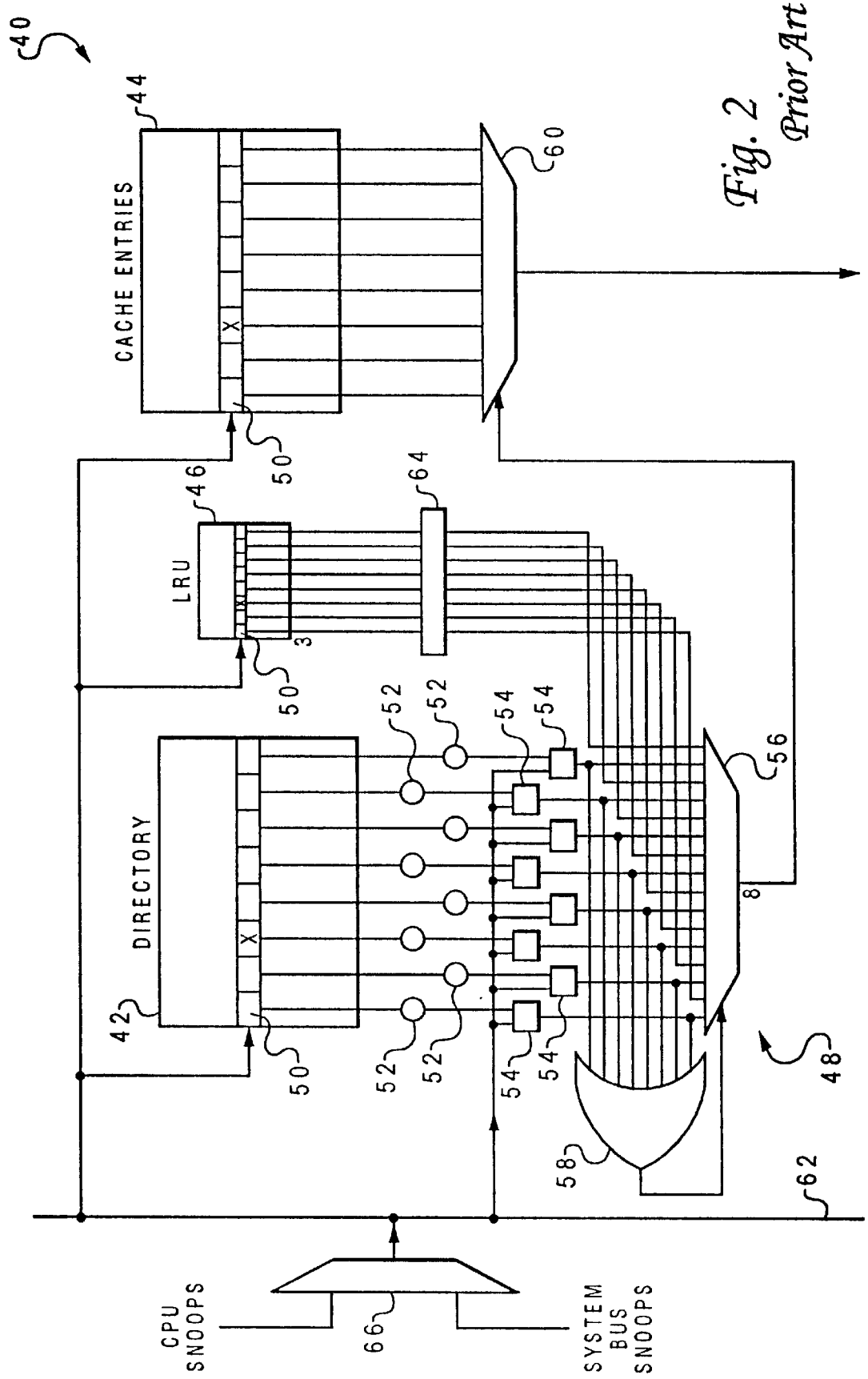
FIG. 2 is a high level schematic diagram of a prior art, set associative cache.

Importantly, since the parity checkers are connected in parallel with the comparators, they are out of the critical path, i.e., the parity checkers do not affect cache performance (i.e., decrease speed) because they can perform the parity checking concurrently, at the same time that the remaining logic is handling the request (of course, the parity checkers decrease speed if an error is found to have occurred, but this is the exception). Also, the parity checkers, which may use conventional parity checking techniques, are less complicated than error correction code (ECC) circuits such as are used in the prior art (compare FIG. 2) and so take up less space on the cache chip (silicon wafer).

The outputs of the parity checkers 78 are connected as inputs to an OR gate 80, so if any address tag in congruence class 74 is originally incorrect, the output of OR gate will become active. This output is connected to a retry circuit 82 and an ECC circuit 84. Retry circuit 82 causes the cache operation to be repeated after a delay sufficient to allow ECC circuit 84 to complete its operation. ECC circuit 84 uses all of the bits from all address tags in congruence class 74, and further uses bits from a special ECC field 86. Only one ECC field is provided for each congruence class, rather than providing one ECC field for each cache block. When ECC circuit 84 operates on the input values, it generates corrected values which are fed back to the cache blocks and ECC field of the congruence class. If a double-bit error is detected, operation of the processing unit can be halted using an appropriate circuit 88.

As with parity checkers 78, ECC circuit 84 is out of the critical path, i.e., it does not operate unless it is necessary, and so does not add any delay during normal (error-free) operation. If the ECC must be used, it takes longer than an ECC circuit would take to correct just a single cache block since ECC circuit 84 must operate on the whole set, but this delay is acceptable in light of the improved performance obtained during normal operation. There is also another advantage to the use of an ECC circuit that operates on the entire congruence class—it reduces the number of overall bits required, even when the parity check bits are factored in. Consider the example of an 8-way set associative cache with 32-bit blocks (address tags). The prior art uses seven ECC bits per block, or 56 bits total for the whole congruence class. The present invention could use one parity bit per block in the tag, plus 10 additional ECC bits for the entire class, so a total of 18 bits is required, cutting the number of overall bits required for error detection/correction to less than one-third that of the prior art. This advantage is due in part to the geometric progression of the ECC function. An 32-bit field requires seven ECC bits; a 64-bit field requires eight ECC bits; a 128-bit field requires nine ECC bits; a 256-bit field (such as congruence class 74) requires only 10 ECC bits.

Rather than including the ECC bits in the directory array, the ECC bits could also be implemented in a separate array (the location of the ECC bits is not directly performance critical).

The number of bits of parity used for each cache block is optimally based on the speed desired. For example, only one parity bit could be used for every 32 bits, instead of every 16 bits, to provide a faster parity check. This approach allows the designer to balance the compare time required by comparators 76 with the parity check time and array size, i.e., to provide maximum parity check ability possible during the time required for comparison. Other ECC codes exist that may be used to maintain parity.

The present invention has several benefits over prior art ECC mechanisms for associate directories. It generally provides faster directory/array access (for a cache hit with no errors). It accomplishes this with a smaller directory/array, and as the associativity is increased the directory/array gets even smaller. The ECC mechanism itself also takes up less area. Finally, the present invention provides these advantages while still maintaining double-bit error detection.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the use of offline parity checkers and an ECC circuit that operates on the entire congruence class is shown for a cache directory, but can in addition be used by a cache entry array. Time is generally more critical with directories and so the invention may be implemented with the directories but not with cache entries, or some other variation could be implemented, such as posting the ECC check for every cache operation regardless of a parity check, i.e., not providing parity checkers or the extra parity bits for each cache block. Also, while the foregoing implementation describes application of ECC bits to an entire congruence class, those skilled in the art will appreciate that the invention can also be implemented by using a single set of ECC bits for more than one congruence class. It is therefore contemplated that such modifications can be made without departing from the spirit or scope of the present invention as defined in the appended claims.

What is claimed is:

1. A method of checking for errors in a cache array used by a processor of a computer system, the method comprising the steps of:

mapping a plurality of memory blocks to a congruence class of the array;

loading a plurality of values into cache blocks of the congruence class;

comparing a requested value associated with one of the memory blocks to the values loaded in the cache blocks; and determining, concurrently with said comparing step, whether the cache blocks collectively contain at least one error, by executing an error correction code based on all bits in the plurality of values in the cache blocks of the entire congruence class.

2. The method of claim 1 wherein said determining step includes the step of performing separate parity checks on each of the cache blocks.

3. The method of claim 2 wherein said determining step executes the error correction code for the entire congruence class in response to said step of performing separate parity checks.

4. The method of claim 2 wherein said step of performing separate parity checks is performed during a time period required for said comparing step.

5. The method of claim 1 wherein the array is a cache directory and the values are address tags, and further comprising the step of associating the requested value with a cache entry in response to said comparing step.

6. The method of claim 1 comprising the further step of determining whether the cache blocks collectively contain a double-bit error.

7. The method of claim 1 further comprising the step of repeating said comparing step after said executing step.

8. The method of claim 1, wherein:

said array includes a plurality of congruence classes including the congruence class;

said method further comprises storing a plurality of error correction code (ECC) values that are each associated with a respective entire congruence class among the plurality of congruence classes within the array; and said step of executing an error correction code includes computing an ECC value based upon all bits in the plurality of values in the cache blocks of the entire congruence class and comparing the computed ECC value with a stored ECC value associated with the congruence class.

9. A computer system comprising:

a processor;

a memory device;

a set associative cache array connected to said processor and said memory device, having a plurality of cache blocks for storing values associated with memory blocks of said memory device, said memory blocks being mapped to a plurality of congruence classes each composed of a plurality of said cache blocks; and means for determining whether cache blocks in a given congruence class collectively contain at least one error, said determining means including means for executing an error correction code based on all bits in the plurality of values in the cache blocks of said given congruence class.

10. The computer system of claim 9 wherein said cache array includes means for comparing a requested value associated with one of said memory blocks to the values stored in said cache blocks to determine if a requested value is present in said cache array.

11. The computer system of claim 10 wherein:

said cache array is a cache directory;

the values are address tags; and said determining means includes means for associating the requested value with a cache entry based upon a comparison performed by said comparing means.

12. The computer system of claim 10 wherein said comparing means compares the requested value to the stored values while said determining means makes a determination of whether the cache blocks in the given congruence class collectively contain at least one error.

13. The computer system of claim 9 wherein said determining means includes means for performing separate parity checks on each of said cache blocks.

14. The computer system of claim 13 wherein said executing means executes said error correction code for said given congruence class in response to an indication from said performing means that one of said cache blocks contains a parity error.

15. The computer system of claim 13 wherein:

said cache array includes means for comparing a requested value associated with one of said memory blocks to the values stored in said cache blocks to determine if a requested value is present in said cache array; and said performing means performs parity checks during a time period required for said comparing means to compare the requested value to the stored values.

16. The computer system of claim 9 wherein said determining means further includes means for detecting whether said cache blocks in said given congruence class collectively contain a double-bit error.

17. The computer system of claim 9 further comprising means for retrying said comparing means after said executing of said error correction code.

18. The computer system of claim 9, wherein said means for determining comprises:

error correction code (ECC) storage that stores a plurality of ECC values that are each associated with a respective entire congruence class among the plurality of congruence classes within the set associative cache array; and an ECC circuit, coupled to the ECC storage, that computes an ECC value based upon all bits in the plurality of values in the cache blocks of the entire congruence class and compares the computed ECC value with a stored ECC value associated with the given congruence class.

19. A cache memory, comprising:

a set associative cache array including a plurality of congruence classes that each contain a plurality of cache blocks storing a plurality of values;

hit/miss logic, coupled to said associative cache array, that determines whether or not a requested value is stored within the set associative cache array;

error correction code (ECC) storage that stores a plurality of ECC values that are each associated with a respective entire congruence class among the plurality of congruence classes within the set associative cache array; and ECC circuitry coupled to the set associative array and the ECC storage, wherein the ECC circuitry determines whether cache blocks in a given congruence class of the set associative cache array collectively contain at least one error based upon an ECC value within the ECC storage associated with the given congruence class and all bits of the plurality of values stored within the cache blocks of the given congruence class.

20. The cache memory of claim 19, wherein said set associative cache array comprises a cache directory and said cache memory further comprises a data array.

21. The cache memory of claim 19, and further comprising parity checking circuitry that performs separate parity checks on each of said cache blocks.

* * * * *